United States Patent [19]
Drury et al.

[11] Patent Number: 5,606,230
[45] Date of Patent: Feb. 25, 1997

[54] DIRECT CURRENT DRIVE SYSTEM

[76] Inventors: Chauncey R. Drury, 322 Ring Rd.;
Gary W. Eisenmenger, 4503 Fox Run Rd., both of Louisville, Ky. 40207

[21] Appl. No.: 468,366

[22] Filed: Jun. 6, 1995

[51] Int. Cl.$^6$ .......................... H02K 25/00; H02K 49/10
[52] U.S. Cl. .......................... 318/41; 318/139; 318/382; 318/519; 310/102 R; 310/113
[58] Field of Search .............................. 318/41, 139, 149, 318/151, 153, 154, 376, 382, 519; 310/102 R, 113, 160, 176, 181

[56] References Cited

U.S. PATENT DOCUMENTS

| | | |
|---|---|---|
| 3,670,238 | 6/1972 | Ronk . |
| 4,163,914 | 8/1979 | Keyes . |
| 4,571,528 | 2/1986 | McGee et al. . |
| 4,780,632 | 10/1988 | Murray, III . |
| 5,234,083 | 8/1993 | Lee . |
| 5,281,094 | 1/1994 | McCarty et al. . |

*Primary Examiner*—Bentsu Ro

[57] ABSTRACT

A Direct Current drive system with a multiplicity of applications including that of powering electric vehicles. The system contains a hybrid electric motor formed by a unique synchronous arrangement of two electrical motors, a primary and a secondary. The single input of Direct Current to the primary motor enables the secondary motor to operate on the Alternating Current generated in the primary motor, and in doing so captures the transformation of energy that takes place during the collapse of a magnetic field. This captured energy is then used to help drive the secondary motor, thus greatly increasing efficiency. A brake/alternator is included to provide a means of slowing/ stopping the motor while at the same time assisting in recharging the primary power source by sending current through a rectifier to the battery which powers the motor.

7 Claims, 3 Drawing Sheets

PRIMARY MOTOR

SECONDARY MOTOR 5,606,230

DIRECT CURRENT DRIVE SYSTEM

BACKGROUND OF THE INVENTION

As mobile electric vehicles develop, any improvement in the efficiency of the motive mechanism appears to be of equal importance with that of the power source.

Drive systems using Direct Current motors of the prevalent state of the art operate from the magnetic attraction/repulsion of a rotating member called the armature within the surrounding perimeter of magnetic lines of force called the field. A more efficient and compact motor may utilize permanent magnets to provide the force lines of the field (Permanent magnets are frequently in the rotating member of Alternating Current motors). Whatever the design of D.C. motors, magnetic lines of force are continuously built and collapsed in the iron segments of the armature. It's dimensions and arrangements require that a minimum amount of electrical turns be used in the windings thereon. For this reason it would be difficult to fully utilize the many lines of magnetic force continuously dissipated in the armature.

Since the force of a collapsing magnetic field may induce an electric current approximately equal to the value that established it (Joseph Henry, 1830) an innovative design for D.C. motors appears desirable. Such a design is suggested in the following writings and drawings.

SUMMARY OF THE INVENTION

The present invention relates to a Direct Current drive system that may be put to a myriad of uses including that of powering electric vehicles of all sorts which rely on Direct Current as their power source. The system is made up of three basic components—a primary motor, a secondary motor, and a brake/alternator.

Power is supplied by a hybrid motor containing a synchronous arrangement of two electrical motors, a primary motor, and a secondary motor. The single input of Direct Current to the primary motor enables the secondary motor to operate on the Alternating Current generated in the primary motor. Both motors being electrically connected so as to utilize the transformation of energy which occurs during the collapse of a magnetic field. The unique connection of the primary and secondary motors of the invention also make possible the development of polyphase current from the Direct Current source.

The synchronous arrangement of these two motors may be achieved either mechanically or electrically, allowing proximity of one to the other to vary as required by equipment design.

The braking action required to slow the momentum of the motor shaft and bring it to a complete stop is accomplished by a unique brake/alternator which uses controlled magnetic attraction as a means to convert the mechanical energy of the rotating shaft into electrical energy. Thus making it possible for the braking action to assist in recharging the motors primary power source which is a Direct Current battery.

DETAILED DESCRIPTION OF THE INVENTION

Figure 1:
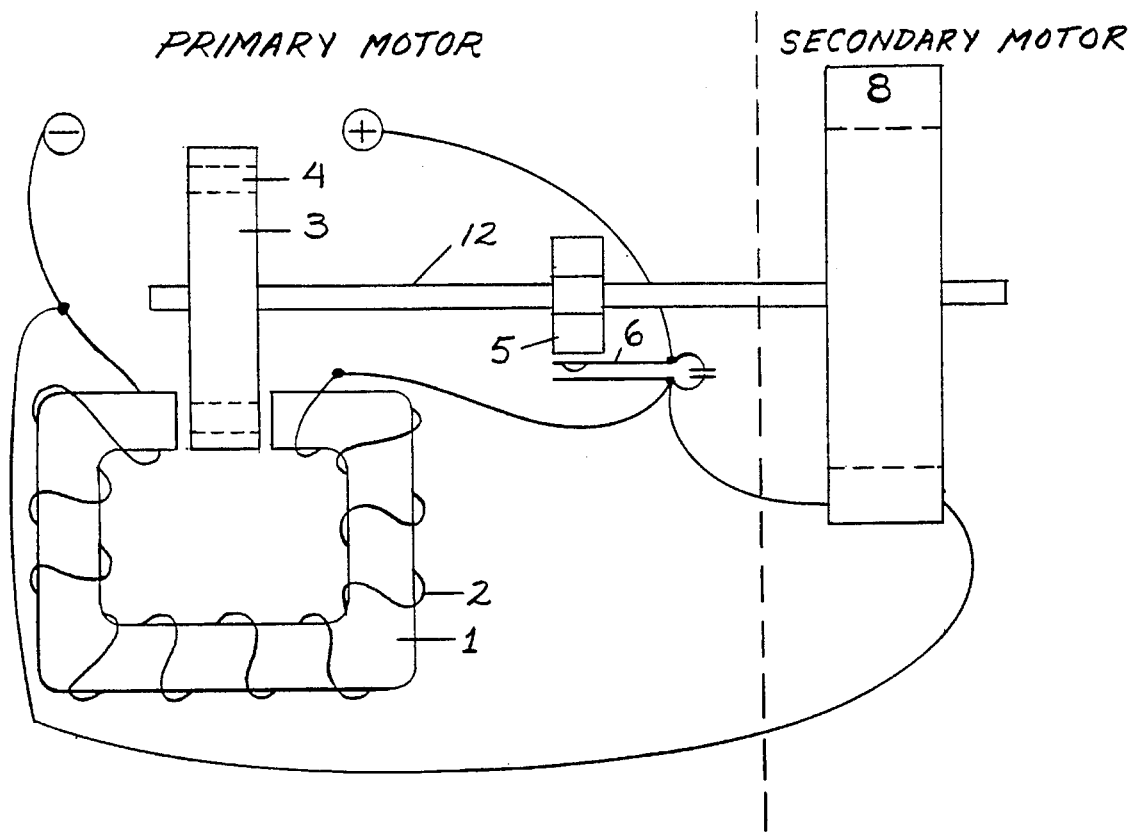
FIG. 1 is a view of the primary motor and secondary motor mounted upon a common shaft.

Referring now to the drawings and in particular to FIGS. 1–6. In FIG. 1 is shown a primary motor consisting of a large iron core 1, in the shape of the letter "C", or having in effect a circular shape that is not complete (removing one portion to form a gap), wound with an insulated conductor 2, of a size and length for the wattage of current, its voltage and resistance, and magnetic and inductive properties. Such a winding will induce a magnetic field of concentrated force between the gap, the magnetic orientation being N/S, or S/N, depending upon the direction of the electric current, whether positive to negative, or negative to positive.

Figure 2:
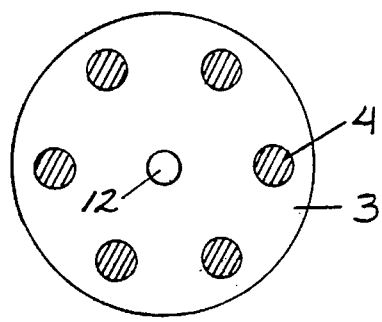
FIG. 2 is a side view of the non-metallic rotor of the primary motor.
Figure 3A:
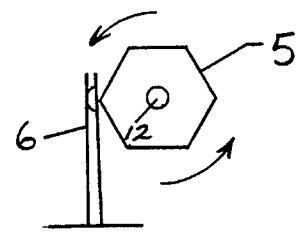
FIG. 3A is a side view of the multi-lobed cam closing the circuit between the motors and the power source.
Figure 3B:
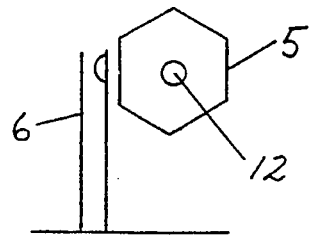
FIG. 3B is a side view of the multi-lobed cam opening the circuit between the motors and the power source.

A non-magnetic rotor 3, further illustrated in FIG. 2, having ferrous inserts 4, equally spaced about its perimeter is arranged to move in the gap of the iron core 1, so the inserts may pass into the area of maximum magnetic strength (lines of force). The number of inserts is a multiple of 2 (two). A multi-lobed cam 5, operates to close (FIG. 3A) and open (FIG. 3B) an electric contact 6, which is indexed to the ferrous inserts of the rotor. The number of cam lobes is a multiple of 2 (two), and is equal to the number of inserts of the rotor. The wound iron core 1, with its windings 2, the rotor 3, with its ferrous inserts 4, and the cam-operated contact 6, together with the central shaft 12, comprise the primary motor as shown in FIG. 1.

Figure 4:
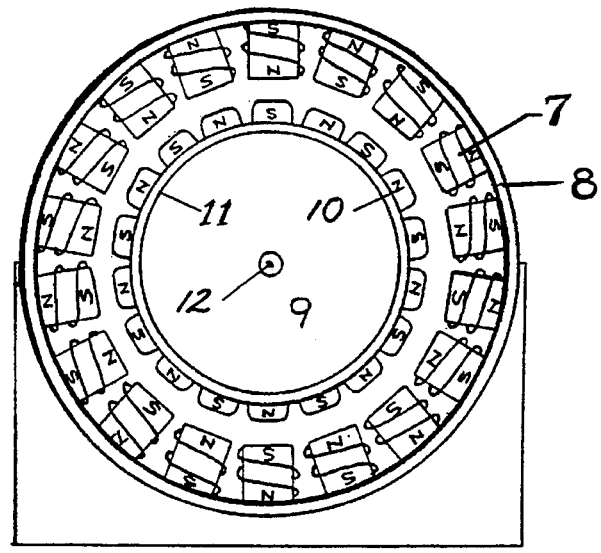
FIG. 4 is a side view of the Secondary motor, illustrating its component parts.

A secondary motor is connected directly across the windings of the primary motor, its configuration is illustrated in FIG. 4. It is comprised of a multiplicity of electromagnets 7, connected in series, but wound in opposite directions on the pole pieces of a circular ring 8, with said pole pieces projecting inwardly toward a rotor 9.

The rotor 9, has attached about its circumference magnets of a permanent nature 10. The faces of the permanent magnets are adjacent, and opposite in polarity (N,S,N,S etc.). The body of the rotor 9, to which the permanent magnets are attached is surrounded by a metallic ring 11, which strengthens their magnetic force. The number of both the electromagnets and the permanent magnets is equal and is divisible by 2 (two). Both the primary motor and the secondary motor may be built on the same shaft as illustrated in FIG. 1, or may be geared together, since their rotation is synchronized to the number of poles, or magnets of the secondary motor, and the number of cam lobes of the primary motor.

In operation, a source of Direct Current is connected through the contacts 6, closed by a high cam lobe 5, to pass to the primary motor and secondary motor and draw a ferrous rotor insert 4, into its field of maximum force, at the same time causing in the secondary motor a permanent magnet 10, to move, repelled by an electromagnet 7, and attracted by its neighbor. Most of the force is generated in the secondary motor because of its many pole-pieces, whereas in the primary motor there is but one. As a low cam lobe 5, opens contact on the primary motor, the collapsing magnetic field induces a current of opposite polarity. This current then passes to the secondary motor where the permanent magnets 10, attached to the rotor 9, are repelled by their momentary location and move again into a newly attractive position. Thus, the current induced by the collapse of the magnetic field in the primary motor powers the secondary motor for ½ cycle.

The rotational speed of the secondary motor is determined by the number of contact off/on events of the primary motor, and may be an exact multiple. For example: If the primary motor has a six-lobed cam, there will be twelve off/on events. Thus, the secondary motor will operate at the same rpm as that of the primary motor only if its rotor contains twelve permanent magnets surrounded by twelve electromagnets. A secondary motor containing eighteen permanent magnets and eighteen electromagnets would create a 2 to 3 rpm ratio when operating with a primary motor having a six-lobed cam, twelve off/on events in relation to the eighteen pole pieces.

Figure 5A:
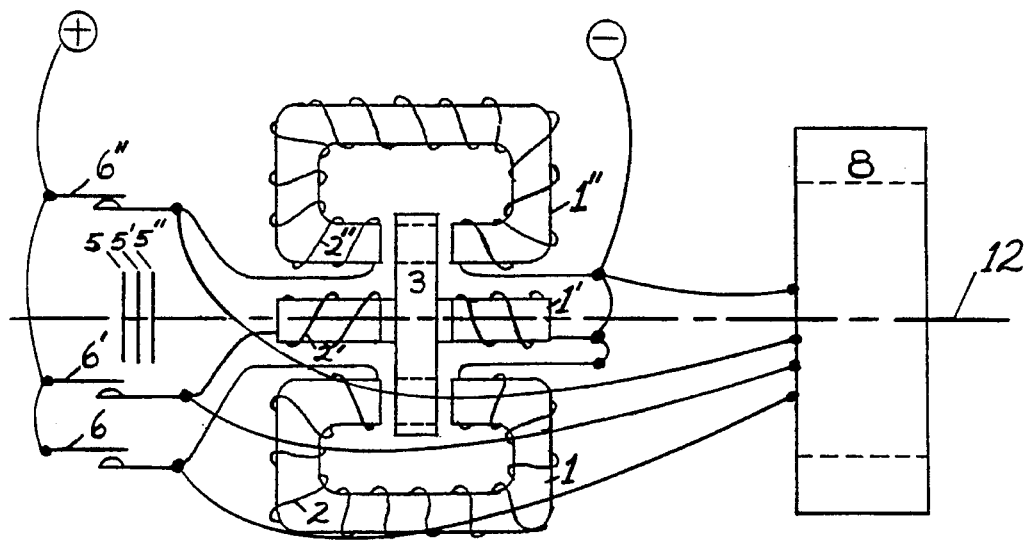
FIG. 5A is a diagram illustrating the possible configuration of wound iron cores around a common rotor to create polyphase current, and the power output of the whole.
Figure 5B:
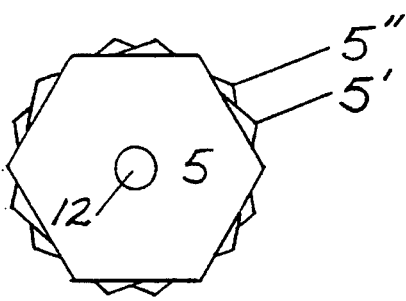
FIG. 5B is a side view illustrating the configuration of multi-lobed cams that would result in polyphase operation when combined with the iron cores illustrated in FIG. 5A.

It is a simple matter to create 3 phase current from a DC source with this invention by simply increasing the number of cores 1, windings 2, and multi-lobed cams 5, from one to three. This configuration is illustrated in FIG. 5A with cores 1, 1', and 1", and in FIG. 5B with cams 5, 5', and 5".

Figure 6:
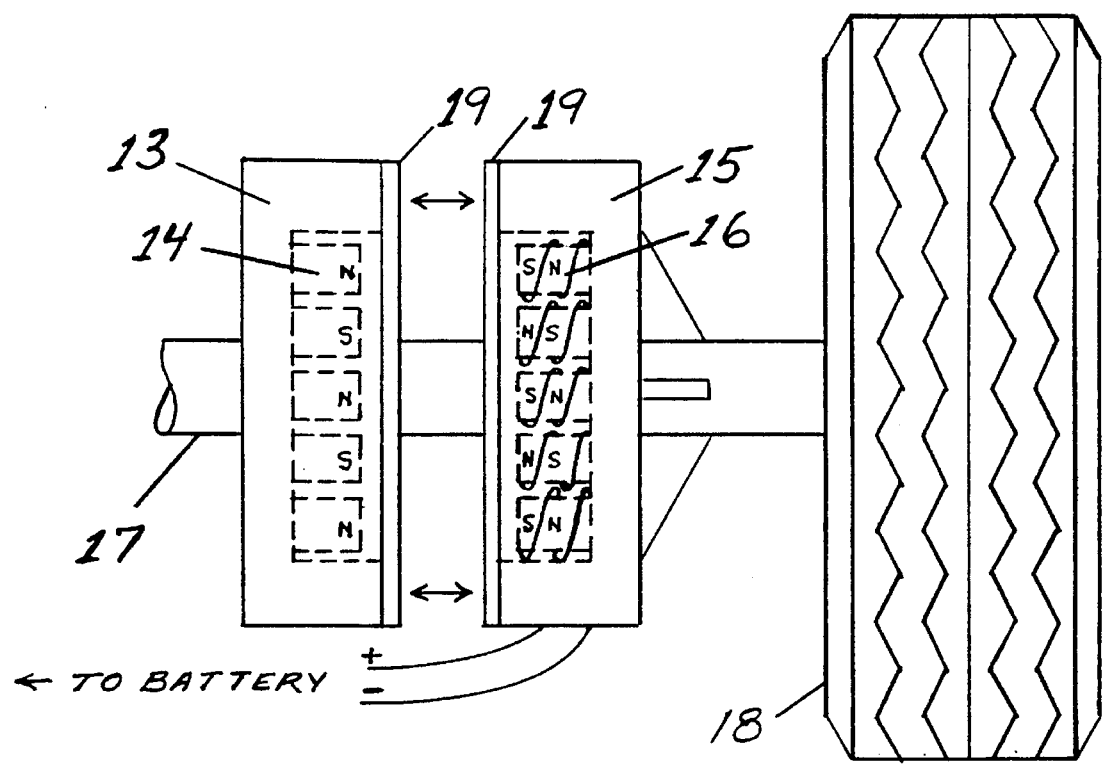
FIG. 6 illustrates the brake/alternator as it might appear mounted in a vehicle about a wheel axle, or on the main shaft of the primary/secondary motors.

The braking action required to slow the momentum of a rotating shaft, such as the main motor shaft or that of a wheel axle, or bring it to a complete stop is accomplished by a brake/alternator illustrated in FIG. 6. This device slows the shaft/axle to a complete stop and in the process changes the mechanical energy of the rotating shaft into electrical energy and serves as a means to feed current through rectifiers back into the motors primary power source which is a DC battery. This partial recharging is achieved by mechanically varying the proximity of a rotating disc 13, containing inset permanent magnets 14, to a fixed disc 15, containing inset electromagnets 16.

The closer the proximity of the discs to one another the greater the magnetic attraction. This increase in magnetic attraction results in a slowing of the shaft/axle 17, to which the drive wheel 18, is attached and thus the vehicle as illustrated in FIG. 6. Another result of the increased magnetic attraction is an increase in the electric current generated by the brake/alternator which is fed back into the battery.

After the r.p.m. has been sufficiently reduced, contact is made between the two brake disc pads 19, whereupon the force of friction causes the shaft/axle to come to a complete stop.

We claim:

1. A direct drive system for multiple applications, the drive system comprising:

a hybrid electric motor formed by the synchronous arrangement of two electrical motors, a primary and a secondary, whereby the single input of direct current into the primary motor enables the secondary motor to operate on the alternating current generated by the primary motor, and wherein the electrical connection of said motors provides means for utilizing the transformation of energy that takes place during the collapse of a magnetic field to drive the secondary motor for ½ of its cycle;

a brake/alternator, containing a disc shaped array of electromagnetic coils, and a disc shaped rotor, said rotor having a plurality of permanent magnets mounted about its opposing face, said coils being mounted adjacent said rotor on a common shaft wherein the braking action resulting in a slowing of the turning of said shaft is a function of the controlled proximity of said coils to said rotor.

2. A direct drive system as set forth in claim 1 wherein said hybrid electric motor further includes a disc shaped non-metallic rotor and a plurality of cam lobes, said rotor containing a plurality of ferrous inserts about its circumference which are equal in number to said cam lobes and divisible by 2, said inserts serving to be drawn into a magnetic field causing said rotor to rotate about a cylindrical shaft.

3. A direct drive system as set forth in claim 1 wherein said hybrid electric motor further includes means for developing polyphase current from a single direct current source, enabeling said motor to power one or more polyphase motors in synchronous rotation.

4. A direct drive system as set forth in claim 1 wherein said hybrid electric motor employs a multiplicity of rotors, contactors, and secondary motors operating out of phase but mounted to a common shaft thus increasing final power output and making possible a variable selection of power.

5. A direct drive system as set forth in claim 1 wherein said hybrid electric motor further includes an electrical contact wherein one contact surface is made of spring copper and the other contact surface is made of carbon graphite, said contact surfaces being intermittently and adjustably pressed together by a polylobed cam to maximize the time of contact and thus maximize the magnetic field created by said electrical contact.

6. A direct drive system as set forth in claim 1 wherein the synchronous arrangement of motors is achieved through electrical connections only, whereupon a single pole primary motor off/on contacts and the collapsing magnetic effect of its electromagnet supplies a square wave, alternating polarity current to a multilobed permanent magnet secondary motor, causing said secondary motor to vary in rotation with the frequency of the off/on events of the single pole primary motor.

7. A direct drive system as set forth in claim 1 wherein said brake/generator further includes means for converting the mechanical energy used in the braking effort to electrical energy and returning said energy to a power supply, said energy being proportionate to the proximity of the coils and rotor disc to one another as well as their r.p.m. prior to braking.

\* \* \* \* \*